United States Patent [19]

Braucksiek, deceased

[11] 3,998,425

[45] Dec. 21, 1976

[54] ELECTROMAGNET ASSEMBLY FOR SAFETY VALVE

[75] Inventor: Henry C. Braucksiek, deceased, late of Buena Park, Calif., by Myrlin J. Braucksiek, administrator

[73] Assignee: Robertshaw Controls Company, Richmond, Va.

[22] Filed: May 22, 1975

[21] Appl. No.: 579,981

[52] U.S. Cl. ................................ 251/129; 335/202; 335/278; 336/192

[51] Int. Cl.[2] .......................................... F16K 31/02

[58] Field of Search .................. 335/278, 202, 281; 336/192, 65; 251/129

[56] References Cited

UNITED STATES PATENTS

| | | | |
|---|---|---|---|
| 2,307,870 | 1/1943 | Wantz | 335/278 |
| 3,566,322 | 2/1971 | Horbach | 336/192 |
| 3,626,339 | 12/1971 | Lisnay | 335/202 |
| 3,848,208 | 11/1974 | Dawson | 336/192 |
| 3,859,614 | 1/1975 | Reithmaier | 336/192 |

*Primary Examiner*—Harold Broome
*Attorney, Agent, or Firm*—O'Brien & Marks

[57] ABSTRACT

An electromagnet is secured to a base and has a winding with ends electrically connected to conductive brackets which are mounted in a housing. The brackets have extending means, such as tabs, flaps, and the like, engaging edge portions of the base to secure the base to the housing.

21 Claims, 10 Drawing Figures

FIG. 6
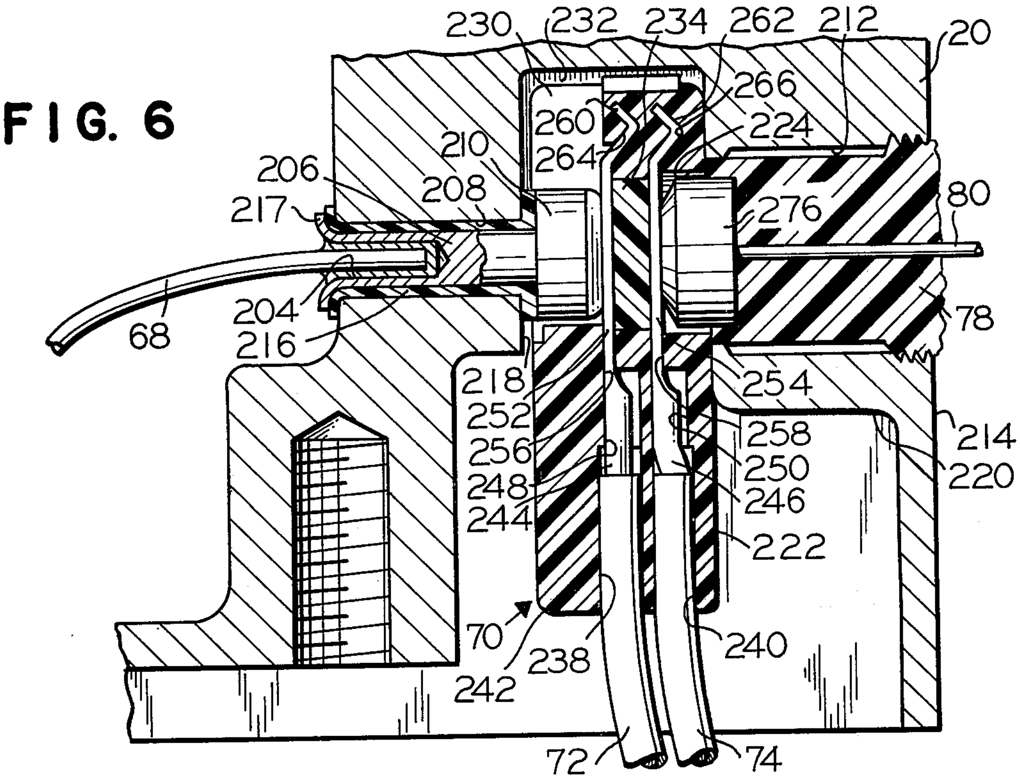
FIG. 7
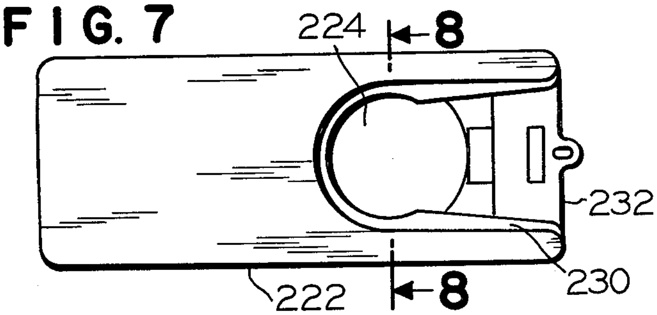
FIG. 8
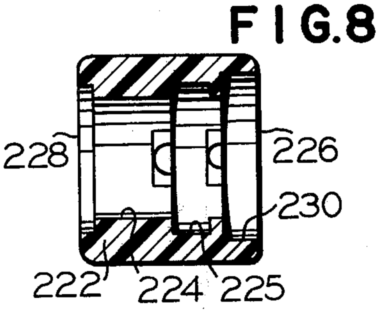
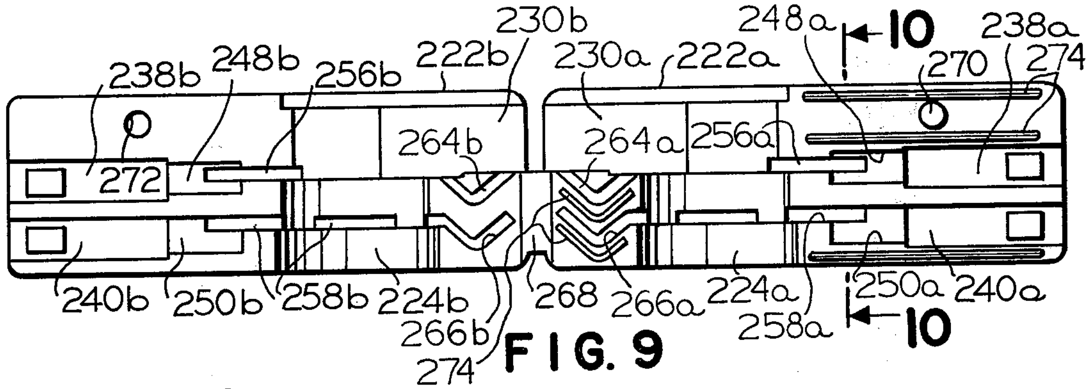
FIG. 9
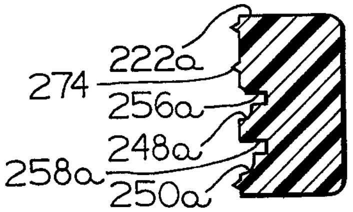
FIG. 10

ELECTROMAGNET ASSEMBLY FOR SAFETY VALVE

BACKGROUND OF THE INVENTION

1. Field of the Invention

The invention relates to electromagnetic assemblies, such as assemblies in electromagnetic safety control valves for gas-fired appliances wherein an electromagnet is used to hold open a valve so long as a pilot flame is sensed by a thermoelectric generator or the like. In certain appliances, such as gas-fired hot water heaters, safety valves may also be responsive to unsafe conditions such as water temperature approaching the boiling point.

2. Description of the Prior Art

The prior art, as exemplified by U.S. Pat. No. 2,636,505, No. 3,034,571, No. 3,581,753, and No. 3,597,138, contains many assemblies of electromagnetic safety valves having connector means to connect electromagnetic windings with external circuit energizing means; such prior art valve assemblies generally having one or more deficiencies, such as being difficult to manufacture or assemble, not being readily repairable or replaceable, being difficult to make in smaller sizes thus necessitating excessively bulky control devices, or being unreliable. In addition, U.S. Pat. No. 2,353,042, No. 2,987,919, No. 3,434,100, No. 3,286,216, No. 3,462,316, No. 3,467,893 and No. 3,474,388 illustrate typical prior art terminals including terminal assemblies for inserting a protective device, such as bimetal switch, in series with a flame sensing thermocouple in a heating system to prevent a dangerous condition, such as steam in a hot water heater.

SUMMARY OF THE INVENTION

The invention is summarized in that an electromagnet assembly includes a magnet core, a base having a central portion and two opposite edge portions, the magnetic core being secured to the central portion of the base, an electromagnetic winding wound around the magnetic core, the winding having two ends, a housing, first and second electrically conductive bracket means attached to the respective winding ends, means securing the first and second conductive bracket means to the housing, and the first and second conductive bracket means each having means extending therefrom and engaging the respective edge portions of the base to secure the base to the housing.

An object of this invention is to provide an electromagnet assembly that is easy to assemble and replace.

Another object of this invention is to construct an electromagnet assembly in which securing means for the magnetic core and base also serve as the connecting means for the energizing windings.

It is another object of this invention to provide an electric terminal assembly for an electromagnetic safety valve wherein a safety switch is readily connected in series with the electromagnet and is easily secured to the valve housing.

Other objects and advantages of the present invention will become apparent from the following description of the preferred embodiment, taken in conjunction with the accompanying drawings.

BRIEF DESCRIPTION OF THE DRAWINGS

FIG. 6 is a cross-section view of an electric terminal assembly of the system in FIG. 1.

FIG. 7 is a top view of an electric terminal body of the terminal assembly of FIG. 6.

FIG. 8 is a cross section taken along the line 8—8 if FIG. 7.

FIG. 9 is an elevation view of the terminal body of FIG. 7 but shown in its unassembled state.

FIG. 10 is a cross section taken along the line 10—10 of FIG. 9.

DESCRIPTION OF THE PREFERRED EMBODIMENT

Figure 1:
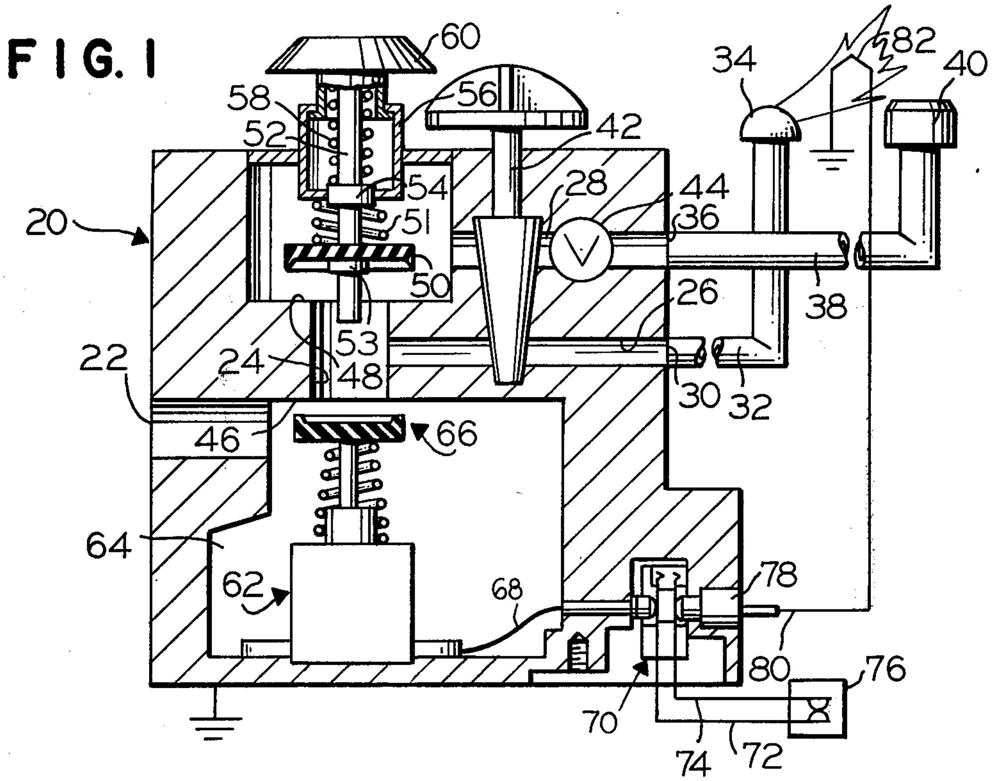
FIG. 1 is a diagram of a gas burner system according to the present invention.

As is illustrated in FIG. 1, the present invention is embodied in a system, such as a gas burning system for a water heater, including a control device with a housing, indicated generally at 20, having an inlet port 22 suitably connected for receiving fuel from a gas source and communicating with a common internal passage 24 which divides into a pair of branch passages 26 and 28. The branch passage 26 defines a pilot flow passage leading to a pilot flow outlet port 30 which communicates with a conduit 32 for supplying fuel to a pilot burner 34. The branch passage 28 defines a main fuel flow passage that communicates through a main flow outlet port 36 to conduit 38 connected to a main burner 40. A manual valve, such as a cock valve 42, is suitably provided to control fuel flow in the branch passages 26 and 28 and has control positions, such as an OFF position, a pilot fuel flow only position, and a pilot and main fuel flow position. A suitable thermostatically operated valve 44 is arranged to control the fuel flow in passage 28.

The pilot flow passage 26 communicates with the common passage 24 intermediate its opposite ends which define upstream and downstream valve seats 46 and 48, respectively. The downstream valve seat 48 is controlled by a combined reset and valve means which includes a valve member 50 slidingly mounted on a reset stem 52 and biased by a spring 51 against a collar 53 fixed a predetermined distance from the lower end of the stem 52. The upper end of the stem 52 extends through a sealing collar 54 on a plunger housing 56, sealingly mounted in the housing 20. A coil spring 58, stronger than the spring 51, in the plunger housing 56 encircles the stem 52 and is mounted in compression between the collar 54 and a push button device 60 on the end of the stem 52.

A safety electromagnet valve assembly, indicated generally at 62, mounted in an input chamber 64 of the housing 20 has a valve mechanism, indicated generally at 66 for closing and opening the valve seat 46. The lower end of the stem 52 is adapted to engage and open the valve mechanism 66 after the valve member 50 has closed the valve seat 48 during depression of the push button 60. An electrical lead 68 from the valve assembly 62 is electrically connected in a series circuit by a connector assembly, indicated generally at 70, with leads 72 and 74 from a high temperature safety switch 76 and by a connector plug 78 with a lead 80 to one side of a thermocouple 82 mounted to extend into a flame from the pilot burner 34. The circuit is completed by a ground connection between the other side of the thermocouple 82 and the housing 20 which is formed from a suitable conductive metal.

Figure 2:
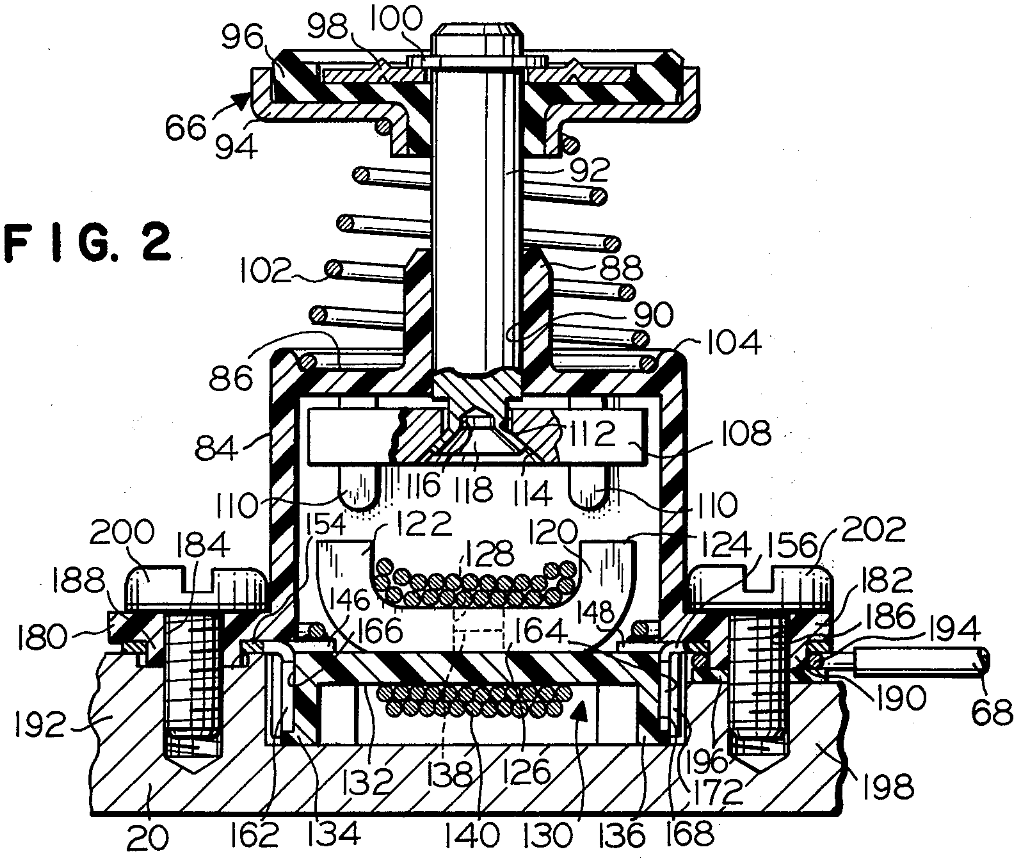
FIG. 2 is a front view of an electromagnet assembly in the system of FIG. 1.

The electromagnetic safety valve assembly 62, as shown in FIG. 2 includes housing or cover 84 which is generally an inverted box-like shape with a top 86 and four sides, and being open at the bottom. The cover 84 is constructed of a suitable insulating material, such as a plastic. An upward extending annular sleeve portion 88 on the top 86 defines a bore 90 for slidingly guiding and supporting an armature stem 92. The valve mechanism 66 includes an annular valve disc 94 and a soft resilient annular valve face 96 sealingly surrounding the stem 92 and retained from slipping off the stem 92 by a valve face retainer 98 and reinforced E-ring 100 secured in an annular groove in the upper end of the stem 92. A coil compression spring 102 surrounding the stem 92 is disposed between the bottom of the valve disc 94 and the top 86 of the housing 84 which has an annular rib 104 containing the bottom of the spring 102. A rectangular armature 108, suitably held in orientation by guiding ribs 110 formed on the interior of the front and back walls of the cover 84, has a center bore 112 with a counter sink 114 at the lower end. The stem 92 has a lower extension 116 which is reduced in diameter and bored to form a tubular-rivet-like portion extending through the bore 112 where the bottom end 118 of the extension 116 is flared to secure the stem 92 to the armature 108 by engagement of the flared end 118 with the countersink 114. The bore 112 is sufficiently larger than the extension 116 and the flared end 118 is formed such as to permit a limited amount of askew movement of the armature 108 relative to the stem 92.

Figure 4:
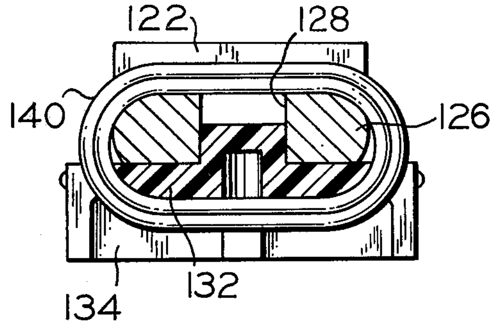
FIG. 4 is a side cross-section view of a base in the electromagnetic assembly of FIG. 2.

A U-shaped magnet core 120 has opposite upward extending end portions 122 and 124 and a central portion or back 126 with a hole 128 extending through the back 126. The back 126 of the core 120 is mounted on a non-magnetic and insulating base indicated generally at 130 and which may be formed, for example, from plastic. The base 130 has a central portion 132 and end or edge portions 134 and 136 forming depending legs for engaging the housing 20 to support the central portion 132 spaced from the housing 20. A cylindrical projection 138 projects upward from a flat top of the central portion 132 of the base 130 into the hole 128 in the back of the core 120. The core 120 is secured to the base 130 by an energizing winding of insulated wire 140 which is tightly wound about the back 126 of the core 120 and also around the central portion 132 of the base 130. As shown in FIG. 4, the bottom front and back edges of the central portion 132 and the edges of the back 126 are rounded.

Figure 3:
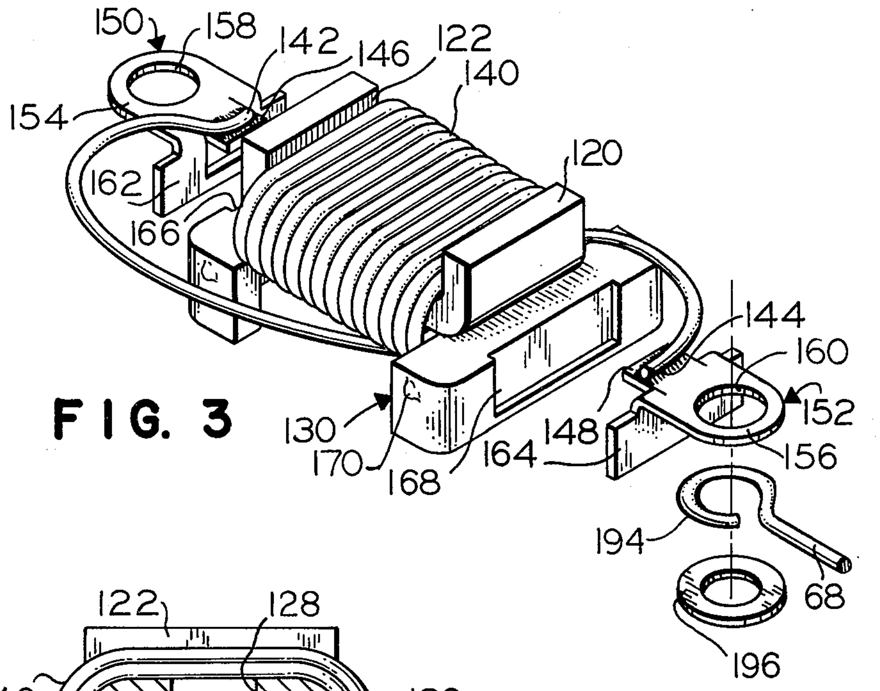
FIG. 3 is an assembly drawing in perspective of a portion of the electromagnet assembly of FIG. 2.

As illustrated in FIG. 3, ends 142 and 144 of the winding wire 140 are electrically connected to tabs 146 and 148 on a pair of brackets indicated generally at 150 and 152. The brackets 150 and 152 are formed from a relatively strong and conductive sheet metal, such as hard brass and include connecting portions 154 and 156 that are planar with the tabs 146 and 148 and have holes 158 and 160 therein. The brackets also have rectangular securing flaps 162 and 164 depending perpendicularly from connecting portions 154 and 156. The securing flaps 162 and 164 are designed to extend into rectangular cut outs or recesses 166 and 168 located in the outside of the left and right side walls at respective ends of the base 130 and to engage the base 130 within the recesses 166 and 168.

Figure 5:
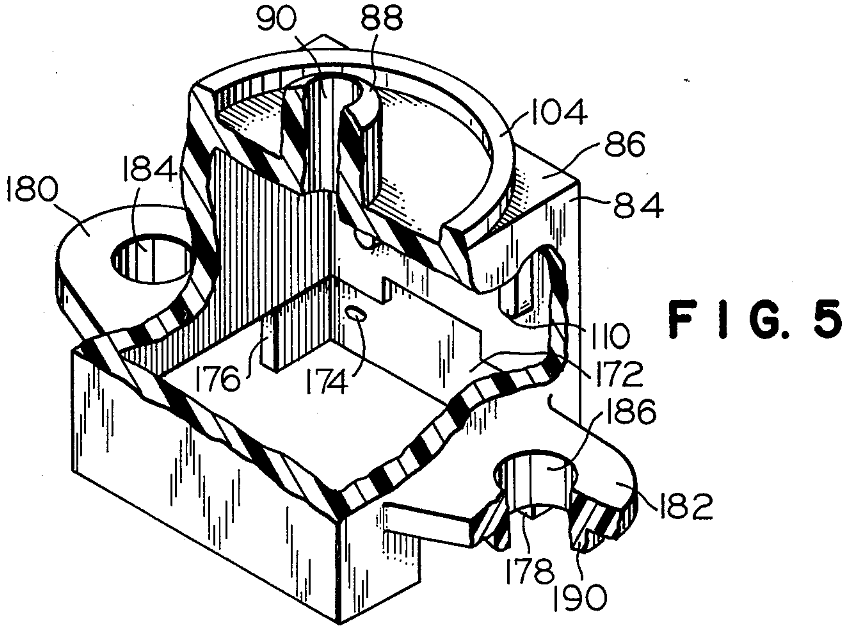
FIG. 5 is a perspective view, partially broken away, of a cover in the electromagnetic assembly of FIG. 2.

The base 130 has protuberances 170 formed on the front and rear surfaces of edge portions 134 and 136. The cover 84, shown in FIG. 5, has a skirt portion 172 designed to receive the base 130 with detents 174 in the skirt portion 172 for receiving the protuberances 170 to retain the cover 84 on the base 130. Cutouts or openings 176 and 178 are formed in the left and right side walls of the skirt portion 172 for receiving the connecting portions 154 and 156 of the brackets 150 and 152 as shown in FIG. 2. The width of the flaps 162 and 164 is wider than the width of the connecting portions 154 and 156 and the width of the cutouts 176 and 178 such that the skirt 172 overlaps front and rear edge portions of the flaps to retain the flaps 162 and 164 in the recesses 166 and 168.

Anchoring tabs 180 and 182 on the cover 84 extend outward from the left and right sides of the cover 84 above the connecting portions 154 and 156 and have holes 184 and 186 extending through depending tubular portions 188 and 190 on the anchoring tabs. The tubular portions 188 and 190 extend through the holes 158 and 160 in the respective connecting portions 154 and 156. The connecting portion 154 of the bracket 150 directly engages a mounting protrusion 192 of the housing 20 while the connecting portion 156 of the bracket 152 engages an eyelet 194 formed on a stripped end of the insulated conductor 68. The eyelet 194 is retained around the tubular portion 190. An annular insulator 196 electrically separates the eyelet 194 and the connecting portion 156 of the bracket 152 from a mounting protrusion 198 of the housing 20.

Securing means such as screws 200 and 202 extend through the respective holes 184 and 186 and are secured within threaded bores in the mounting protrusions 192 and 198 to tightly engage the connecting portion 154 with the protrusion 192 and the connecting portion 156 with the eyelet 194.

Conductor 68 as shown in FIG. 6, is electrically connected by welding, soldering or the like at its other stripped end in a bore 204 in the end of a shank portion 206 of a feed through connector which extends through a hole 208 in the housing 20. A head portion 210 of the connector extends into the bottom of a socket 212 formed in an outside wall 214 of the housing 20. A tubular insulator 216 electrically separates the shank portion 206 from the wall of the hole 208 and has flanged ends respectively separating the head portion 210 from the housing 20 and separating an outwardly flared end 217 of the portion 206 to tightly seal and mount the feed through connector in the housing 20.

An opening or well 218 of rectangular cross section is formed in a wall 220 of the housing 20 to extend perpendicularly into the bottom of the socket 212 for slidingly receiving the connector assembly 70. Ends of the conductors or lines 72 and 74 extend into an insulator body 222 of the assembly 70. As shown in FIGS. 7 and 8, the insulator body 222 has a rectangular parallelepiped configuration with a central opening 224 extending between opposite sides 226 and 228 thereof and with a channel 230 formed in the side 226 from the end 232 to the opening 224 for slidingly receiving the head portion 210 of the feedthrough connector. Adjacent the channel 230, the opening 224 has an enlarged annular cavity 225 for retaining a disc insulator 234. FIG. 6, to separate the channel 230 from the lower portion of the opening 224.

The insulated conductors 72 and 74, as illustrated in FIG. 6, extend into respective bores 238 and 240 in the end 242 of the insulated body 222. Stripped portions 244 and 246 of the conductors 72 and 74 extend forward from the bores 238 and 240 into passages 248 and 250 and have end portions 252 and 254 which are flattened and retained within slots 256 and 258 opening into the opening 224 on respective sides of the disc insulator 234. The flattened end portions 252 and 254 extend across the opening 224 along the opposite faces of the insulator 234 and terminate in tortuous portions 260 and 262 which are retained in mating tortuous slots 264 and 266 in the connector body 222 opposite the slots 256 and 258.

As illustrated in FIGS. 9 and 10, the connector body 222 can conveniently be formed by molding the connector body into halves 222a and 222*b* joined by a hinge portion 268. Pairs of recesses or cavities 224*a*–224*b*, 230*a*–230*b*, 238*a*–238*b*, 240*a*–240*b*, 248*a*–248*b*, 250*a*–250*b*, 256*a*–256*b*, 258*a*–258*b*, 264*a*–264*b*, and 266*a*–266*b* are made in the respective halves 220*a*–220*b* to form the respective opening 224, channel 230, bores 238 and 240, passages 248 and 250, and slots 256, 258, 264, and 266 in the connector body when the halves are folded together about the hinge portion 268. The half 222*a* has a projection 270 and the half 222*b* has a mating cavity 272 formed thereon to align the halves 222a and 222b when folded together. One half, 222*a*, has ribs 274 formed on the face thereof to be engaged against the other half, 222*b*, so that ultrasonic energy applied to the halves 222*a* and 222*b* suitably melts the ribs 274 to form a weld between the connector halves 222*a* and 222*b*.

The connector plug 78, FIG. 6, is removably secured within the socket 212 by suitable means such as threads and has a cylindrical contact element 276 mounted thereon and projecting into the opening 224 from the side 228. The plug 78 suitably connects the electrical line 80 to contact element 276 while insulating the line 80 and contact element 276 from the housing 20. The contact element 276 forms an abutment projecting into the opening 224 to engage the portion of the connector body 222 surrounding the opening 224 to retain the connector assembly 70 within the opening 218 of the housing 20.

In assembly of the electromagnetic assembly 62, shown in FIG. 2, the U-shaped magnetic core 120 is placed on the base 130 with the projection 138 fixing the position of the core 120 by engagement in the hole 128 in the core 120. The electromagnetic wire 140 is wound tightly around the back 126 of the core 120 and the central portion 132 of the base 130 to secure the core 120 to the base 130. The ends of the winding 140 are welded, soldered or otherwise electrically joined to the tabs 146 and 148 of the brackets 150 and 152. The brackets 150 and 152 are positioned with the flaps 162 and 164 in the recesses 166 and 168 of the base 130 and with the tabs 146 and 148 engaging the top surface of the base 130. The valve stem 92 and the attached armature 108 are inserted in the cover 84 which is then snapped over the base 130 locking the flaps 162 and 164 in recesses 166 and 168. The disc 94, the spring 102, the valve face retainer 98, and the reinforcement ring 100 are assembled on the stem 92. The eyeley 194 is positioned over the tubular portion 190 and whole assembly is placed on the housing 20 with the annular insulator 196 separating the eyelet 194 from the protrusion 198. The electromagnetic valve assembly is secured within the housing 20 by inserting the screws 200 and 202.

The connector assembly 70 is formed by stripping the end portions of the conductors 72 and 74 and flattening the stripped end portions. The extreme ends of the flattened portions 252 and 254 are bent into the tortuous portions 260 and 262. The ends of the conductors 72 and 74 are suitably assembled in the cavities formed in one half of the insulator block halves 222*a*–222*b* together with the insulator disc 234. The connector block halves 222*a* and 222*b* are folded together and welded to complete the connector assembly. The connector assembly 70 is inserted into the opening 218 with the channel 230 slidably receiving the contact head or element 210. The connector plug 78 is installed into the socket 212 to sandwich the flattened conductor portions 252 and 254 and separating disc 234 between contacts 210 and 276.

In operation in the heating system in FIG. 1, the manual valve 42 is rotated to the "pilot" position from the "off" position and pilot burner 34 is ignited while the push button 60 is held in a depressed position where the valve seat 48 is closed and the valve seat 46 is open. The end of the reset stem 52 depresses the valve stem 92 to engage the armature 108 against the upstanding portions 122 and 124 of the magnetic core 120. When the thermocouple 82 is sufficiently heated by the flame of the pilot burner 34, current generated in the line 80 passing through the connector assembly 70, the leads 72 and 74 and the conductor 68 to the winding 140 energizes the core 120 sufficiently to retain the armature 108 against the force in the spring 102. Thus the push button 60 can then be released and the valve 42 turned to the "on" position to allow the main burner 40 to be operated by the thermostatic valve 44.

In the event that the thermocouple fails to sense a flame from the pilot burner 34, the current through the conductor 80 and winding 140 is insufficient to energize the core 120 to retain the armature against the force of the spring 102; thus the safety valve 66 closes to stop the flow of fuel and prevent a hazardous position. The system may be restarted by turning the manual valve 42 back to the "pilot" position and by again pushing the button 60 and igniting the pilot burner.

In the event that the over-temperature switch 76 senses a temperature approaching the dangerous condition, such as the boiling point of water, the contacts of the switch 76 open, terminating the current flow through the conductor 80 in the leads 72 and 74 which de-energizes the electromagnetic assembly 62 closing the valve mechanism 66. Afer the over-temperature switch 76 has sufficiently cooled to close its contacts, the heating system may be restarted again in a manner previously described.

The brackets 150 and 152 serve both as an anchoring means for the core and base assembly and as a connecting means between the winding 140 and energizing means for the winding 140. The bracket 150 connects the one end 142 of the winding 140 directly to the housing 20 which serves as a ground connection for the circuit. The bracket 152 connects the end 144 of the winding 140 to the eyelet 194 and the conductor 68 which are insulated by the tubular portion 190 and the insulator 196 from the housing 20. Both the tabs 146 and 148 engaging the top of the base 130 and the flaps 162 and 164 engaging the bottom portion and end portions of the recesses 166 and 168 serve to secure the base to the housing. The securing means or screws 200 and 202 also connect the anchoring tabs 180 and 182 to the housing along with the conductive brackets 150 and 152.

Inasmuch as the described embodiment is subject to many variations, modifications, and changes in detail, it is intended that all matter contained in the foregoing description and shown in the accompanying drawings be interpreted as illustrative and not in a limiting sense.

What is claimed is:

1. An electromagnet assembly comprising
a magnetic core,
a base having a central portion and two opposite edge portions, said magnetic core being secured to the central portion of the base,
an electrical winding wound around the magnetic core, said winding having two ends,
a housing,
first and second electrically conductive bracket means attached to the respective winding ends,
means securing the first and second conductive bracket means to the housing, and
said first and second conductive bracket means each having means extending therefrom and engaging the respective edge portions of the base to secure the base to the housing.

2. An electromagnet assembly as claimed in claim 1 wherein
the means extending from each of the first and second bracket means includes a tab projecting onto the base, the ends of the winding being secured to the respective tabs.

3. An electromagnet assembly as claimed in claim 1 wherein
each edge portion of said base has a recess, and
the means extending from each of the first and second conductive bracket means extends into the respective recesses to secure the base to the housing.

4. An electromagnet assembly as claimed in claim 1 wherein
the base is non-magnetic, and
the electrical winding is tightly wound around both the magnetic core and the central portion of the base to secure the core to the base.

5. An electromagnet assembly as claimed in claim 3 wherein
each of the first and second bracket means has a securing portion having a hole defined therein and a tab planar with the securing portion,
the ends of the windings are attached to the respective tabs of the first and second bracket means,
the means extending from each of the first and second bracket means includes a flap depending at a right angle from the respective securing portions, and
the securing means extends through the hole in the securing portion of each bracket means to secure the bracket means to the housing.

6. An electromagnet assembly as claimed in claim 1 wherein
the housing is electrically conductive,
the base is non-magnetic and electrically non-conductive,
the first bracket means contacts the housing to connect one end of said winding to the housing, and
there is included electrically insulating means separating the second bracket means from the housing.

7. An electromagnet assembly as claimed in claim 1 including
a cover having two oppositely projecting anchoring tabs enclosing the base and the core,
each of the first and second bracket means extending under a respective anchoring tab, and
the securing means projecting through each anchoring tab and extending through the respective bracket means to secure the cover and base to the housing.

8. An electromagnet assembly comprising
an electrically conductive housing;
an electrically insulating non-magnetic base in the housing having two ends, a central portion with an upper flat face between the ends, two legs depending from the base adjacent the respective ends, two rectangular recesses defined in the respective ends, and a cylindrical pin projecting upward from the flat face;
a magnetic core having a back, two arms upstanding therefrom and a hole defined in the back;
said pin on the base projecting into the hole in the core;
a wire having two ends and wound about the back of the core and the central portion of the base to secure the core to the base;
first and second conductive mounting brackets each having a securing portion with a hole defined therein, a tab planar with the securing portion, and a rectangular flap depending at a right angle from the securing portion;
said ends of the wire being connected to the respective tabs on the brackets;
each of said brackets located at a respective end of the base;
said flaps of the bracket extending into the respective recesses in the base for engaging the base and securing the base to the housing;
an armature;
a stem carrying the armature;
a cover formed from an electrically insulating material and enclosing the base, the core, and the armature;
said cover having an opening through which the stem projects;
said cover also having two oppositely projecting anchoring tabs each having a hole defined therein;
said housing having a socket therein;
a contact element extending through the housing and into the bottom of the socket;
said housing having an opening extending perpendicular to the socket and opening into the bottom of the socket;
a terminal assembly slidably received in the opening and having a channel defined therein to slidably receive said contact element, said terminal assembly being adapted for connecting to external circuit means;
a conductor having two ends, one end connected to said contact element;
an annular conductive eyelet attached to the other end of said conductor;
an annular insulator;
first and second securing members;
said first securing member having a head portion and a shank portion which extends through the hole in one anchoring tab of the cover and through the hole in the first bracket and is secured to the housing, said first bracket contacting the housing to electrically ground one end of the wire; and said second securing member having a head portion and a shank portion which extends through the hole in the other anchoring tab of said cover, the hole in the second bracket, the hole in the eyelet, and the hole in the insulator, and is secured to the housing, said eyelet and said second bracket engaging to electrically connect the other end of said wire to said conductor and said terminal assembly, and said annular insulator separating said eyelet and bracket from the housing.

9. An electromagnet assembly as claimed in claim 8 wherein the other anchoring tab has a depending tubular portion extending through the holes in the second bracket and the eyelet, the second securing member extends through the tubular portion whereby the depending tubular portion separates the second bracket and the eyelet from the second securing member, the shanks of the first and second securing members have threads, and the housing has bores with threads receiving the shanks.

10. An electromagnet assembly comprising an electromagnet having a magnetic core with an energizing winding thereon, a housing enclosing the electromagnet therein and having a socket formed in one wall of the housing and an opening extending transversely into the bottom of the socket from another wall of the housing, a contact element connected electrically to the winding and projecting into the bottom of the socket, a terminal assembly slidably received in the opening in said housing and including an insulator with a channel defined in one side of the insulator and extending to the forward end of the insulator to receive the contact element, said insulator also having a contact receiving cavity defined therein opposite the channel, said terminal assembly having first and second conductors extending into the respective bottoms of the channel and the contact receiving cavity, said first and second conductors being adapted to connect to an external electrical device, a plug having a contact head thereon, said plug being received in said socket and said contact head entering said contact receiving cavity of said terminal assembly to engage the first and second conductors with the respective contact element and contact head and to lock the terminal assembly in the opening.

11. An electromagnet assembly as claimed in claim 10 wherein the first and second conductors are insulated round wires which have portions adjacent the ends with the insulation stripped therefrom, said stripped portions being flattened with the distal ends of the flattened stripped portions bent into a tortuous configuration; and the insulator has passageways formed therein receiving the flattened stripped portions, said passageways having tortuously extending portions receiving the tortuous configured ends of the flattened stripped portions to secure the conductors in the insulator.

12. An electromagnetic valve comprising a magnetic core, a base having a central portion and two opposite edge portions, said magnetic core being secured to the central portion of the base, an electrical winding wound around the magnetic core, said winding having two ends, a housing having a valve seat, first and second electrically conductive bracket means attached to the respective winding ends, means securing the first and second conductive bracket means to the housing, said first and second conductive bracket means each having means extending therefrom and engaging the respective edge portions of the base to the housing, and valve means operated by the magnetic core for closing the valve seat, the means extending from each of the first and second bracket means including a tab projecting onto the base, the ends of the winding being secured to the respective tabs.

13. An electromagnetic valve as claimed in claim 12 wherein the housing is electrically conductive, the base is non-magnetic and electrically non-conductive, the first bracket means contacts the housing to connect one end of said winding to the housing, and there is included electrically insulating means separating the second bracket means from the housing.

14. An electromagnetic valve as claimed in claim 12 including a cover having two oppositely projecting anchoring tabs enclosing the base and the core within the housing, each of the first and second bracket means extending under a respective anchoring tab, and securing means projecting through each anchoring tab and extending through the respective bracket means to secure the cover and base to the housing.

15. An electromagnetic valve comprising a magnetic core, a base having a central portion and two opposite edge portions, said magnetic core being secured to the central portion of the base, each edge portion of said base having a recess, an electrical winding wound around the magnetic core, said winding having two ends, a housing having a valve seat, first and second electrically conductive bracket means attached to the respective winding ends, means securing the first and second conductive bracket means to the housing, said first and second conductive bracket means each having means extending therefrom and engaging the respective edge portions of the base to secure the base to the housing, and valve means operated by the magnetic core for closing the valve seat, the means extending from each of the first and second conductive bracket means extending into the respective recesses to secure the base to the housing.

16. An electromagnetic valve as claimed in claim 15 wherein each of the first and second bracket means has a securing portion having a hole defined therein and a tab planar with the securing portion, the ends of the windings are attached to the respective tabs of the first and second bracket means, the means extending from each of the first and second bracket means includes a flap depending at a right angle from the respective securing portions, and the securing means extends through the hole in the securing portion of each bracket means to secure the bracket means to the housing.

17. An electromagnetic valve comprising a magnetic base, a base having a central portion and two opposite edge portions, said magnetic core being secured to the central portion of the base, the base being non-magnetic, an electrical winding wound around the magnetic core, said winding having two ends, a housing having a valve seat, first and second electrically conductive bracket means attached to the respective winding ends, means securing the first and second conductive bracket means to the housing, said first and second conductive bracket means each having means extending therefrom and engaging the respective edge portions of the base to secure the base to the housing, and valve means operated by the magnetic core for closing the valve seat, the electrical winding being tightly wound around both the magnet core and the central portion of the base to secure the core to the base.

18. An electromagnetic valve comprising an electrically conductive housing having an inlet, an outlet, a chamber communicating with the inlet, and a valve seat disposed between the chamber and the outlet, an electrically insulating non-magnetic base in the housing having two ends, a central portion with an upper flat face between the ends, two legs depending from the base adjacent the respective ends, two rectangular recesses defined in the respective ends, and a cylindrical pin projecting upward from the flat face;

magnetic core having a back, two arms upstanding therefrom and a hole defined in the back;

said pin on the base projecting into the hole in the core;

a wire having two ends and wound about the back of the core and the central portion of the base to secure the core to the base;

first and second conductive mounting brackets each having a securing portion with a hole defined therein, a tab planar with the securing portion, and a rectangular flap depending at a right angle from the securing portion;

said ends of the wire being connected to the respective tabs on the brackets;

each of said brackets located at a respective end of the base;

said flaps of the bracket extending into the respective recesses in the base for engaging the base and securing the base to the housing;

an armature operably disposed relative to the core;

a stem on the armature;

a cover formed from an electrically insulating material and enclosing the base, the core, and the armature;

said cover having an opening through which the stem slidably projects;

said cover also having two oppositely projecting anchoring tabs each having a hole defined therein;

said housing having a socket therein;

a contact element extending through the housing and into the bottom of the socket;

said housing having an opening extending perpendicular to the socket and opening into the bottom of the socket;

a terminal assembly slidably received in the opening and having a channel defined therein to slidably receive said contact element, said terminal assembly being adapted for connecting to external circuit means;

a conductor having two ends, one end connected to said contact element;

an annular conductive eyelet attached to the other end of said conductor;

an annular insulator;

first and second securing members;

said first securing member having a head portion and a shank portion which extends through the hole in one anchoring tab of the cover and through the hole in the first bracket and is secured to the housing, said first bracket contacting the housing to electrically ground one end of the wire;

said second securing member having a head portion and a shank portion which extends through the hole in the other anchoring tab of said cover, the hole in the second bracket, the hole in the eyelet, and the hole in the insulator, and is secured to the housing, said eyelet and said second bracket engaging to electrically connect the other end of said wire to said conductor and said terminal assembly, and said annular insulator separating said eyelet and bracket from the housing;

valve means responsive to outward movement of the stem for closing the valve seat;

means for biasing the valve means closed; and means for opening the valve means.

19. An electromagnetic valve as claimed in claim 18 wherein the other anchoring tab has a depending tubular portion extending through the holes in the second bracket and the eyelet;

the second securing member extends through the tubular portion whereby the depending tubular portion separates the second bracket and the eyelet from the second securing member, the shanks of the first and second securing members have threads, and the housing has bores with threads receiving the shanks.

20. An electromagnetic valve comprising a housing having an inlet, a chamber, an outlet, and a valve seat disposed between the inlet and the outlet;

an electromagnet within the chamber having a magnetic core with an energizing winding thereon;

valve means operated by the magnetic core for closing the valve seat;

said housing having a socket formed in one wall of the housing and an opening extending transversely into the bottom of the socket from another wall of the housing;

a contact element connected electrically to the winding and projecting into the bottom of the socket;

a terminal assembly slidably received in the opening in said housing and including an insulator with a channel defined in one side of the insulator and extending to the forward end of the insulator to receive the contact element, said insulator also having a contact receiving cavity defined therein opposite the channel;

said terminal assembly having first and second conductors extending into the respective bottoms of the channel and the contact receiving cavity;

said first and second conductors being adapted to connect to an external electrical device; and a plug having a contact head thereon, said plug being received in said socket and said contact head entering said contact receiving cavity of said terminal assembly to engage the first and second conductors with the respective contact element and contact head and to lock the terminal assembly in the opening.

21. An electromagnetic valve as claimed in claim 20 wherein the first and second conductors are insulated round wires which have portions adjacent the ends with the insulation stripped therefrom, said stripped portions being flattened with the distal ends of the flattened stripped portions bent into tortuous configuration; and the insulator has passageways formed therein receiving the flattened stripped portions, said passageways having tortuously extending portions receiving the tortuous configured ends of the flattened stripped portions to secure the conductors in the insulator.

* * * * *